United States Patent [19]
Hino et al.

[11] Patent Number: 5,748,592
[45] Date of Patent: May 5, 1998

[54] DISK DRIVE APPARATUS AND DISK STORAGE MEDIUM FOR HIGH DENSITY RECORDING

[75] Inventors: Yasumori Hino, Nara; Norio Miyatake, Hyogo; Masahiro Birukawa; Tadashi Nakamura, both of Osaka, all of Japan

[73] Assignee: Matsushita Electric Industrial Co., Ltd., Osaka, Japan

[21] Appl. No.: 794,816

[22] Filed: Feb. 4, 1997

[30] Foreign Application Priority Data

Feb. 7, 1996 [JP] Japan ................................. 8-021159

[51] Int. Cl.⁶ ........................................................ G11B 7/00
[52] U.S. Cl. ........................................ 369/59; 369/48
[58] Field of Search ................................ 369/59, 58, 54, 369/116, 275.3

[56] References Cited

U.S. PATENT DOCUMENTS

| | | | |
|---|---|---|---|
| 4,325,135 | 4/1982 | Dil et al. | 369/110 |
| 4,750,058 | 6/1988 | Hirt et al. | 360/46 |
| 4,964,107 | 10/1990 | Galbraith et al. | 368/120 |
| 5,260,703 | 11/1993 | Nguyen et al. | 341/100 |
| 5,280,466 | 1/1994 | Tomita | 369/275.1 |
| 5,402,403 | 3/1995 | Maeda | 369/44.32 |
| 5,537,381 | 7/1996 | Puza | 369/116 |
| 5,615,205 | 3/1997 | Belser | 369/275.3 |
| 5,623,474 | 4/1997 | Oshio et al. | 369/124 |

*Primary Examiner*—Nabil Hindi
*Attorney, Agent, or Firm*—Merchant, Gould, Smith, Edell, Welter & Schmidt, P.A.

[57] ABSTRACT

A disk drive apparatus is provided that can reproduce data at low bit error rate even if a crosstalk is large. This apparatus comprises means for writing three or more different states of record marks in a read track and adjacent tracks thereof on a disk storage medium, means for detecting read levels of the record marks in the read track, means for calculating every possible read level regarding every possible combination of the record marks in the read track and adjacent tracks thereof according to the detected read levels, and means for performing most-liklihood decoding of written data in accordance with the possible read levels as reference levels.

9 Claims, 9 Drawing Sheets

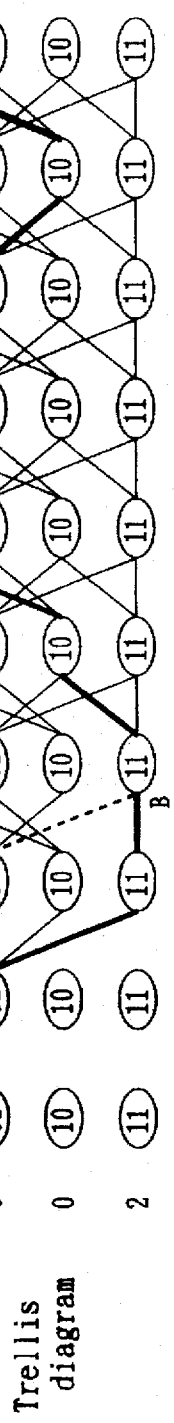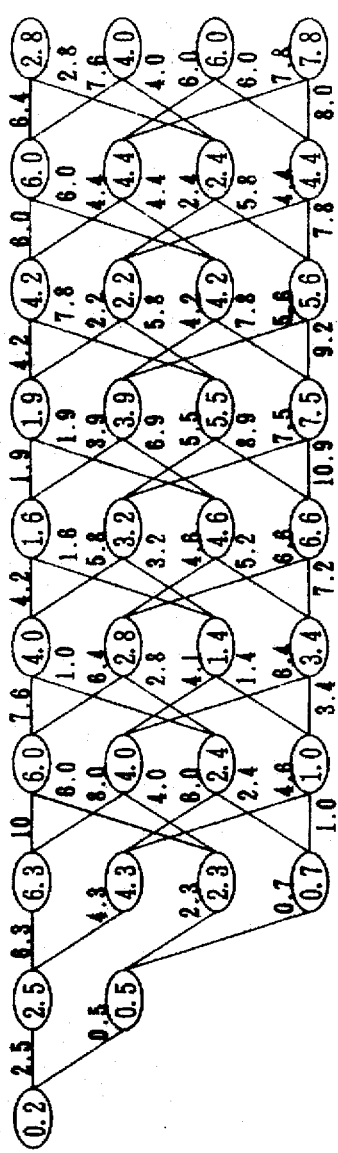
FIG.6A
FIG.6B
FIG.6C

DISK DRIVE APPARATUS AND DISK STORAGE MEDIUM FOR HIGH DENSITY RECORDING

BACKGROUND OF THE INVENTION

The present invention relates to a disk drive apparatus and a disk storage medium for recording data in high density.

Recently, an optical disk has been used as a mass storage medium, and methods for wider application for using an optical disk for mass storage are still being developed. The recording density of an optical disk has been increased up to 0.3 micron per bit in linear density using a technology such as a partial response, and up to 1.0 micron per track in track density. Concerning partial response, various methods for increasing the linear density have been developed (U.S. Pat. Nos. 4,750,058, 4,964,107, 5,260,703). Some methods for increasing the recording density in the track density are also proposed (U.S. Pat. Nos. 5,280,466, 5,402,403, 4,325,135). In one of the methods, a part of a disk is provided with some pits for detecting crosstalk, and the crosstalk level between tracks is detected by reading the pits. The reproduction of the written data in the disk is performed properly by eliminating crosstalk of adjacent tracks from the read signal.

However, the above method has a disadvantage. Three independent circuits are necessary for reproducing three read signals of three tracks simultaneously. Thus, the apparatus tends to become complicated. In addition, an adaptive transversal filter should be used for processing the signals since the three read signals have some phase differences. This also becomes a factor of complication of the apparatus.

It might be possible to read the three track signals by single laser beam sequentially, i.e., by reading the signals of the adjacent tracks and storing the sampled values in a memory prior to the reading of the read track. However, in this case, high-speed access to data might be difficult.

There is another problem in the method of the prior art. The method for eliminating crosstalk is hard to use in the case where the crosstalk level varies according to the writing condition.

SUMMARY OF THE INVENTION

A disk drive apparatus according to the present invention comprises means for writing three or more different states of record marks in a read track and adjacent tracks thereof on a disk storage medium, and means for detecting read levels of the record marks in the read track. The apparatus also comprises means for calculating every possible read level regarding every possible combination of the record marks in the read track and adjacent tracks thereof according to the detected read levels, and means for performing most-liklihood decoding of written data in accordance with the possible read levels as reference levels.

First, a general principle of reproducing written data in the disk is explained below. A recording and reproducing system is considered where −1 or 1 is obtained as a read signal when 0 or 1 is written in the disk. The simple disk drive apparatus in the prior art decodes the read signal by regarding a signal level of more than or equal to 0 as 1, and a signal level of less than 0 as 0, as shown in Table 1.

TABLE 1

| Written data | 0 | 1 | 1 | 0 | 1 | 0 | 1 | 1 | 1 | 0 |
|---|---|---|---|---|---|---|---|---|---|---|
| Read data | −1 | 1 | 1 | −1 | 1 | −1 | 1 | 1 | 1 | −1 |
| Decoded data | 0 | 1 | 1 | 0 | 1 | 0 | 1 | 1 | 1 | 0 |

In such a simple decoding, bit error rate increases in accordance with increasing of crosstalks from adjacent tracks. Table 2 shows an example where 25% and 30% of crosstalks from the adjacent tracks exist.

TABLE 2

| Written data | | | | | | | | |
|---|---|---|---|---|---|---|---|---|
| 1st adjacent track | 0 | 1 | 1 | 1 | 0 | 0 | 1 | 0 |
| Read track | 0 | 0 | 0 | 1 | 1 | 0 | 1 | 0 |
| 2nd adjacent track | 0 | 1 | 0 | 0 | 1 | 0 | 1 | 1 |
| Effecting level | | | | | | | | |
| 1st crosstalk | −0.5 | 0.5 | 0.5 | 0.5 | −0.5 | −0.5 | 0.5 | −0.5 |
| Read track | −1 | −1 | −1 | 1 | 1 | −1 | 1 | −1 |
| 2nd crosstalk | −0.6 | 0.6 | −0.6 | −0.6 | 0.6 | −0.6 | 0.6 | 0.6 |
| Read data | −2.1 | 0.1 | −1.1 | 0.9 | 1.1 | −2.1 | 2.1 | −0.9 |
| Decoded data | 0 | 1 | 0 | 1 | 1 | 0 | 1 | 0 |
| Correct data | 0 | 0 | 0 | 1 | 1 | 0 | 1 | 0 |

As shown in Table 2, a bit error occurs due to a crosstalk when the written data of the read track is "0" and the written data of the adjacent tracks are both "1". The simple decoding method in the prior art can not decode correctly when the crosstalk level exceeds a certain level.

The disk drive apparatus according to the present invention calculates every possible read level of the read track regarding every possible combination of record marks in the read track and adjacent tracks thereof, and performs most-liklihood decoding of written data in the disk storage medium. Thus, the bit error rate due to crosstalk is suppressed in the disk drive apparatus according to the present invention. This operation is further explained below.

In the case where 25% and 30% of crosstalks exist as shown in table 2, the read level of the read track is one of eight states depending if the data of the adjacent track is "1" or "0".

TABLE 3

| Read track | 1st adjacent track | 2nd adjacent track | Read level |
|---|---|---|---|
| 0 | 0 | 0 | −2.1 |
| 0 | 0 | 1 | −0.9 |
| 0 | 1 | 0 | −1.1 |
| 0 | 1 | 1 | 0.1 |
| 1 | 0 | 0 | −0.1 |
| 1 | 0 | 1 | 1.1 |
| 1 | 1 | 0 | 0.9 |
| 1 | 1 | 1 | 2.1 |

Written data in the disk can be decoded correctly even if crosstalks exist by regarding the read levels of −2.1, −0.9, −1.1 and 0.1 as data "0", and regarding the read levels of 2.1, 0.9, 1.1 and data −0.1 as data "1" according to Table 3.

It is necessary to know read levels corresponding to data "1" and "0" for the decoding method mentioned above. For this purpose, the disk drive apparatus according to the present invention writes record marks, which enable detecting of every possible combination of read levels of Table 3, into the disk storage medium. For example, eight combinations of Table 3 may be written as shown in FIG. 9. These record marks may be written preferably at the same time with data writing. It is also preferable to write these record marks one or more times in every smallest unit area for writing data.

Read levels corresponding to data "1" and "0" are obtained by detecting the levels of these record marks. For example, concerning data of track N in FIG. 9, read levels of points 1–4 of the read signal waveform shown in FIG. 9 correspond to the read level of data "1", and read levels of points 5–8 correspond to the read level of data "0". Concerning data of track N−1, read levels of points 1, 2, 5, 6 correspond to the read level of data "1", and read levels of points 3, 4, 7, 8 corresponds to the read level of data "0". Similarly, concerning data of track N+1, read levels of points 1, 3, 5, 7 correspond to the read level of data "1", and read levels of points 2, 4, 6, 8 correspond to the read level of data "0".

As mentioned above, read levels, which correspond to data "1" and "0", can be obtained by writing predetermined combinations of record marks adding to write data. It is not necessary to write every combination of marks, though the above mentioned example uses eight combinations of marks shown in Table 3. When the read level of data "1" is +s, the read level of data "0" is −s, the ratio of the crosstalk level of the track N−1 to s is p, and the ratio of the crosstalk level of the track N+1 to s is q, read levels of Table 3 can be rewritten using s, p, q as shown in Table 4.

TABLE 4

| Read track | 1st adjacent track | 2nd adjacent track | Read level |
| --- | --- | --- | --- |
| 0 | 0 | 0 | −s−ps−qs |
| 0 | 0 | 1 | −s−ps+qs |
| 0 | 1 | 0 | −s+ps−qs |
| 0 | 1 | 1 | −s+ps+qs |
| 1 | 0 | 0 | s−ps−qs |
| 1 | 0 | 1 | s−ps+qs |
| 1 | 1 | 0 | s+ps+qs |
| 1 | 1 | 1 | s+ps+qs |

Values of three variable s, p and q are obtained by calculating three different states of read levels of the read track and adjacent tracks thereof. In other words, read data corresponding to data "1" and "0" are obtained from the read level of three or more combinations of the read levels of the read track and adjacent tracks thereof.

In a real disk drive apparatus, another noise of read/write system is added to the crosstalk noise, so that the read level varies from the level shown in Table 4. In order to decode data correctly in such condition, this disk drive apparatus compares a read level with eight possible levels shown in Table 4, and selects a state in which the absolute value of the difference between two levels is smallest, and performs decoding of "1" or "0".

As explained above, the disk drive apparatus according to the present invention writes three or more different states of record marks in a read track and adjacent tracks thereof. The apparatus detects the read level of these marks, and calculates every possible read level regarding every possible combination of the record marks in the read track and adjacent tracks thereof according to the detected read levels. The apparatus performs most-liklihood decoding of written data in accordance with the possible read levels as reference levels. Thus, the disk drive apparatus according to the present invention can reproduce written data correctly even if the crosstalks of the adjacent tracks are large.

Another configuration of the disk drive apparatus according to the present invention comprises means for writing three or more different states of record marks in a read track and adjacent tracks thereof in plural areas on a disk storage medium, means for detecting read levels of the record marks in the read track from the plural areas, means for averaging plural read levels detected from the plural areas to produce average read levels, means for calculating every possible read level regarding every possible combination of said record marks in the read track and adjacent tracks thereof according to the average read levels, and means for performing most-liklihood decoding of written data in accordance with the possible read levels as reference levels.

This disk drive apparatus uses average values of plural read levels of the plural areas on the disk for determining the crosstalk levels. Thus, noises included in the read levels are reduced. As a result, the bit error rate can be further improved.

BRIEF DESCRIPTION OF THE DRAWINGS

In the accompanying drawings:

FIG. 6 is an explanatory diagram of a Viterbi algorithm;

DETAILED DESCRIPTION OF THE PREFERRED EMBODIMENTS

Figure 1:
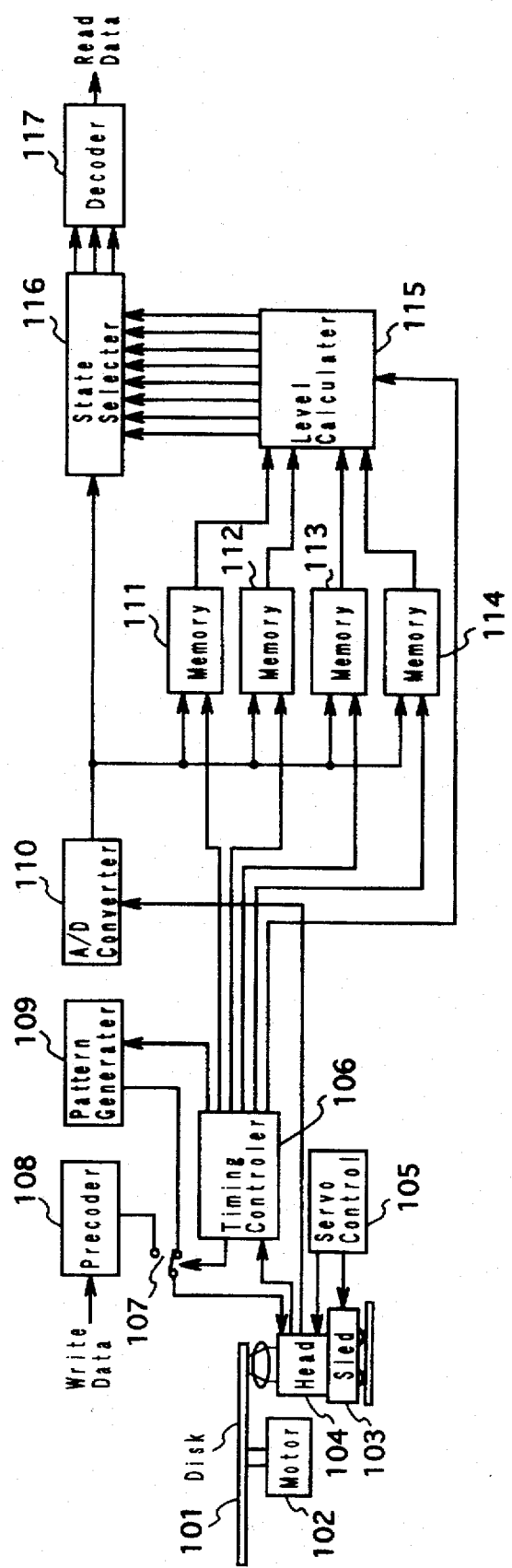
FIG. 1 is a block diagram of a first embodiment of a disk drive apparatus according to the present invention.

FIG. 1 illustrates a block diagram of an optical disk data decoding apparatus as a first embodiment of the present invention. In FIG. 1, numeral 101 is a disk storage medium for recording data, numeral 102 is a motor for rotating the disk storage medium 101, numeral 103 is a sled for moving a read/write head to the position for read/write position, numeral 104 is an optical read/write head, numeral 105 is a servo controller for controlling focus, tracking and access of the optical head 104, numeral 106 is a timing controller for controlling timing of read and write, numeral 107 is a switch for selecting a write data or a mark pattern for detecting read levels, numeral 108 is a precoder for encoding a write data, numeral 109 is a pattern generator for generating a mark pattern for detecting read levels, numeral 110 is an A/D converter for converting the read signal into a digital value, numerals 111–114 are memories for storing the read levels, numeral 115 is a level calculator for calculating read levels corresponding to states of the read track and adjacent tracks thereof, numeral 116 is a state selector for selecting a level that is nearest to the read level from the eight outputs of the calculator 115, and numeral 117 is a decoder for decoding "0" or "1" in accordance with the output of the state selector 116.

Figure 2:
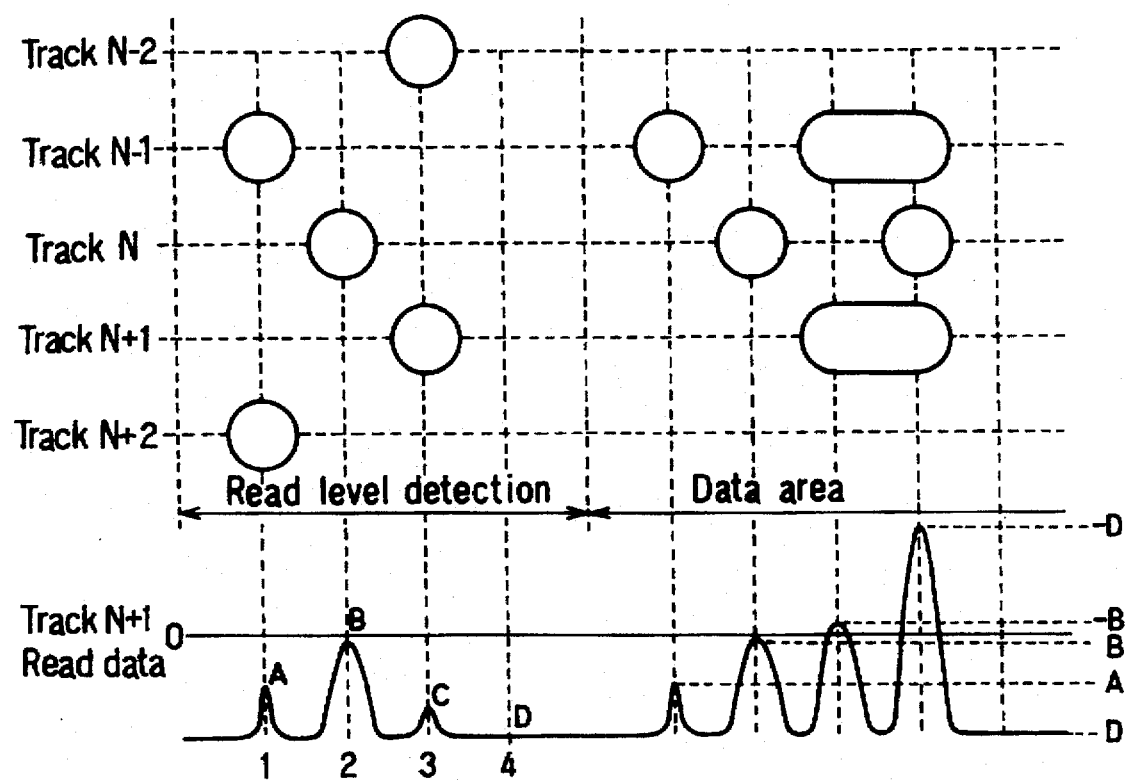
FIG. 2 is an explanatory diagram of a method for detecting read levels by the disk drive apparatus shown in FIG. 1.

This disk drive apparatus selects write data or mark patterns for detecting read level, by using the switch 107, so as to write the record marks for detecting read levels as shown in FIG. 2 together with write data. Since the record mark is written at the same time with data writing, crosstalk levels shown in FIG. 2 are substantially same with those of data area. The timing controller generates a timing clock from pits that are formed on the disk storage medium. This timing clock is used for adjusting phases of the record marks between adjacent tracks in order.

The marks for detecting read levels are written such that only one mark or no mark exists at one point in neighboring tracks. When track N is read, for example, the read signal shown in FIG. 2 is obtained. Read levels at points 1-4 in FIG. 2 are stored in the memories 111-114. When read levels at points 1-4 are A, B, C, D, and read level corresponding to data "1" is +s, and read level corresponding to data "0" is -s, the ratio of the crosstalk level of the track N-1 to s is p, and the ratio of the crosstalk level of the track N+1 to s is q, next equations are derived.

$$-s+sp-sq=A$$

$$s-sp-sq=B$$

$$-s-sp+sq=C$$

$$-s-sp-sq=D$$

Then, s, p and q are obtained from above equations as below.

$$s=(B-D)/2$$

$$p=(A-D)/(B-D)$$

$$q=(C-D)/(B-D)$$

These obtained s, p and q are used for calculating every possible state of read levels (eight levels) of the read track and adjacent tracks thereof as shown in Table 5.

TABLE 5

| Read track | 1st adjacent track | 2nd adjacent track | Read level |
|---|---|---|---|
| 0 | 0 | 0 | D |
| 0 | 0 | 1 | C |
| 0 | 1 | 0 | A |
| 0 | 1 | 1 | -B |
| 1 | 0 | 0 | B |
| 1 | 0 | 1 | -A |
| 1 | 1 | 0 | -C |
| 1 | 1 | 1 | -D |

Read levels to be obtained are very simple as shown in Table 5 since the marks for detecting read levels are written in an area for read level detection such that only one mark or no mark exists at one point in the read track and adjacent tracks thereof. The calculator 115 performs this calculation. The calculator 115 outputs eight levels corresponding to eight combinations of data "1" and "0" in the read track and adjacent tracks thereof. The state selector 116 compares the eight outputs from the calculator 115 and a real read level to select a state in which the absolute value of the difference between two levels is smallest. The state selector 116 outputs a value of 0, 1, . . ., or 7 depending on which level of the above eight levels is nearest to the read level. The decoder 117 performs data decoding in accordance with the output of the state selector 116.

Figure 3:
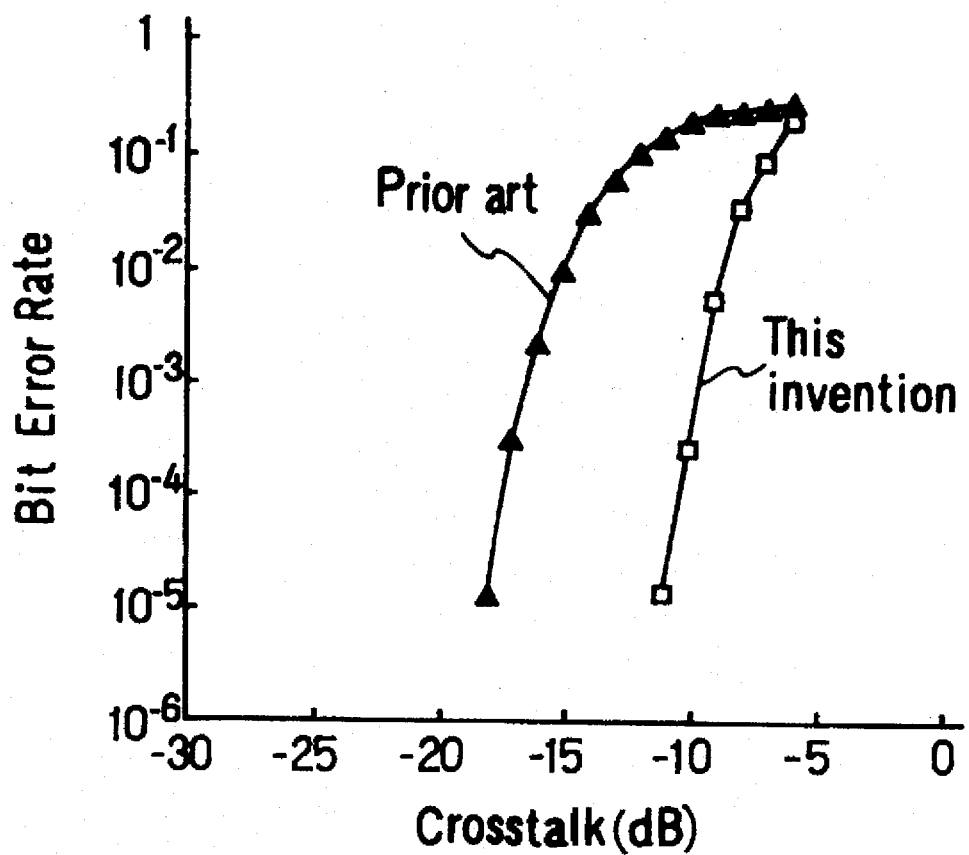
FIG. 3 is a graph of crosstalk levels vs. bit error rates comparing the disk drive apparatus shown in FIG. 1 with the disk drive apparatus in the prior art.

A graph of crosstalk levels vs. bit error rates of the disk drive apparatus explained above is shown in FIG. 3, compared with that of the disk drive apparatus that uses the simple binary decoding method in the prior art. The abscissa of the graph is a ratio (decibels) of the crosstalk level to the read level of the read track. As shown in FIG. 3, the disk drive apparatus of this embodiment can reproduce data at low error rate even if the crosstalk is large, and suitable for write and read of a high density optical disk using a narrow track pitch.

In this embodiment, the mark for detecting the read level is written such that only one mark exists (points 1, 2, 3) or no mark exists (point 4) at one point in the read track and adjacent tracks thereof as shown in FIG. 2. However, it is not necessary to limit such combinations of marks. The crosstalk levels can be determined if any three states of the read levels in the read track and adjacent tracks thereof are detected, since three equations are enough to determine three variables for crosstalk levels.

It is preferable to provide the marks for detecting read levels in every sector that is the smallest unit area for writing data. This is because the crosstalk level varies in accordance with a writing condition, and it is better to detect the crosstalk level in every writing unit.

Now, a second embodiment of the disk drive apparatus according to the present invention is explained below. This embodiment uses a partial response (1, 1) reproduction system (hereinafter, this will be abbreviated to PR(1, 1) system). This embodiment uses an optical disk as a storage medium and a magnetic field modulation system as a recording system that enables finer pitch recording than optical resolution of the laser beam. The bit error ratio vs. crosstalk level is improved also in such read/write system by applying the present invention.

First, the partial response reproduction system is explained. The PR(1, 1) system performs reproduction of written data under the condition where two continuous record marks interact with each other. If "-1" is written in a disk for the write data "0" and "1" is written for the write data "1", the read signal without noise is one of three values -2, 0, 2.

In this PR(1, 1) reproduction system, two bits of data are read simultaneously with an interaction between them. Therefore, one of four states 00, 01, 10, 11 is obtained. This state transition is illustrated as trellis diagram in (b) of FIG. 6, where numerals in circles represent states. This state transition diagram shows every possible path starting from the state (00).

Referring FIG. 6, a Viterbi algorithm, which is one of the most-liklihood decoding methods, is explained below. In the reproduction system without any noise, read signal values of state 00, 01, 10 and 11 are -2, 0, 0 and 2. The absolute value of the difference between the read signal of each state and the real read signal is defined as a branch metric. The metric, which is a sum of the branch metrics along a path, indicates a mark distance between the read signals along the path. The most-liklihood decoded data is obtained by selecting the path in which the metric is smallest, from the paths in the state transition diagram shown in (b) of FIG. 6.

In (b) of FIG. 6, two paths, which start from point A of the state (00) and end at point B of the state (11), are illustrated in a thick line and a broken line. The metric of the first path illustrated in the thick line is 1.0, and the metric of the second path illustrated in the broken line is 4.6. Comparing these two paths, the path whose metric is smaller is selected as a survivor. Such operation is repeated among every possible path shown in (b) of FIG. 6. Thus, the path whose metric is smallest is determined using a very simple operation. This operation is called Viterbi algorithm. For reference, the surviving path in this example is illustrated in thick lines in (b) of FIG. 6. Selected metric values are shown in circles in (c) of FIG. 6 and the metric value of each path is shown by the numeral on the line of each path in (c) of FIG. 6.

The disk drive apparatus of this embodiment includes a most-liklihood decoder that is a Viterbi decoder having states with crosstalks. This disk drive apparatus can decode written data correctly even if the crosstalk is large, as explained below referring FIG. 4.

Figure 4:
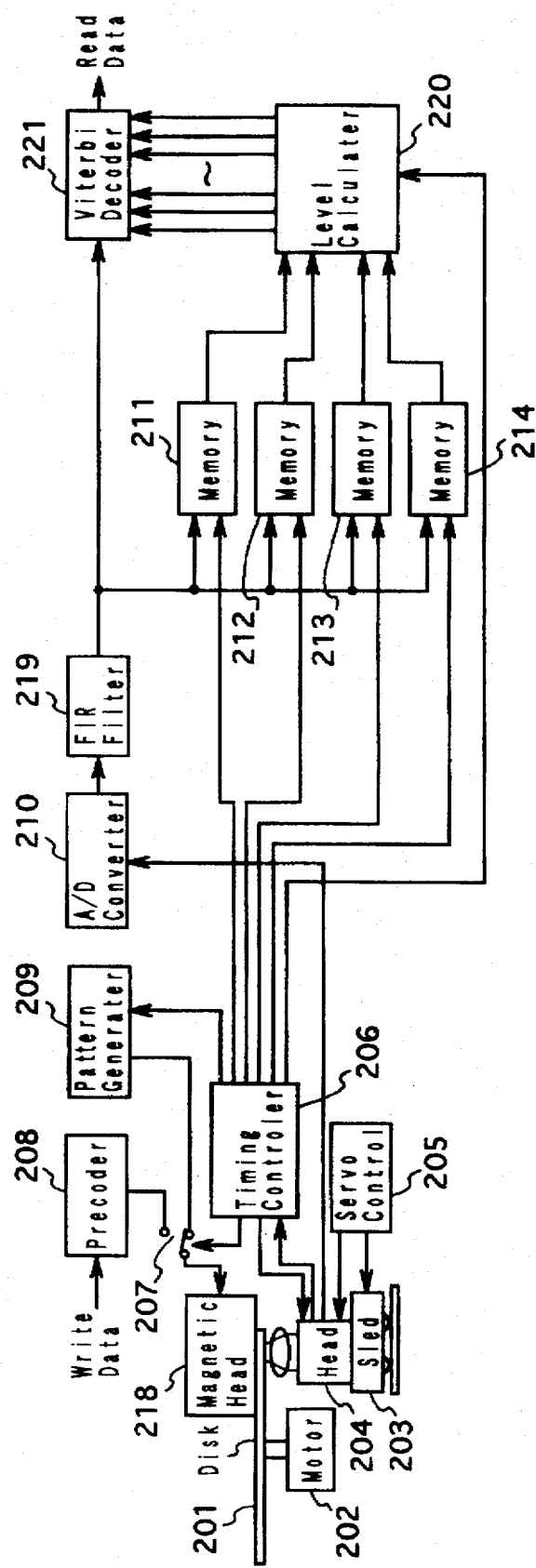
FIG. 4 is a block diagram of a second embodiment of a disk drive apparatus according to the present invention.

In FIG. 4, numeral 201 is a disk storage medium for recording data, numeral 202 is a motor for rotating the disk storage medium 201, numeral 203 is a sled for moving a read/write head to the position for read/write position, numeral 204 is an optical read/write head, numeral 218 is a magnetic head for applying a modulating magnetic field to the storage medium, numeral 205 is a servo controller for controlling focus, tracking and access of the optical head 204, numeral 206 is a timing controller for controlling timing of read and write, numeral 207 is a switch for selecting a write data or a mark pattern for detecting read levels, numeral 208 is a precoder for encoding a write data, numeral 209 is a pattern generator for generating a mark pattern for detecting read levels, numeral 210 is an A/D converter for converting the read signal into a digital value, numerals 211–214 are memories for storing the read levels, numeral 220 is a level calculator for calculating read levels corresponding to states of the read track and adjacent tracks thereof using outputs of the memories 211–214, numeral 221 is a Viterbi decoder for performing most-liklihood decoding in accordance with the outputs of the level calculator 220.

The Viterbi decoding in the prior art uses four states because only the states of the read track should be considered. However, the Viterbi decoding according to the present invention uses 64 (4×4×4) states because the states of adjacent tracks as well as the read track should be considered. If the read level corresponding to data "1" is +s, and read level corresponding to data "0" is −s, the ratio of the crosstalk level of the track N−1 to s is he ratio of the crosstalk level of the track N+1 to s is q, levels are such as shown in Table 6.

TABLE 6

| Read track | 1st adjacent track | 2nd adjacent track | Read level |
|---|---|---|---|
| 00 | 00 | 00 | −2s−2ps−2qs |
| 00 | 00 | 01 | −2s−2ps |
| 00 | 00 | 10 | −2s−2ps |
| 00 | 00 | 11 | −2s−2ps+2qs |
| 00 | 01 | 00 | −2s −2qs |
| 00 | 01 | 01 | −2s |
| 00 | 01 | 10 | −2s |
| 00 | 01 | 11 | −2s +2qs |
| 00 | 10 | 00 | −2s −2qs |
| 00 | 10 | 01 | −2s |
| 00 | 10 | 10 | −2s |
| 00 | 10 | 11 | −2s +2qs |
| 00 | 11 | 00 | −2s+2ps−2qs |
| 00 | 11 | 01 | −2s+2ps |
| 00 | 11 | 10 | −2s+2ps |
| | | | |
| | (omission) | | |
| | | | |
| 11 | 10 | 00 | 2s −2qs |
| 11 | 10 | 01 | 2s |
| 11 | 10 | 10 | 2s |
| 11 | 10 | 11 | 2s +2qs |
| 11 | 11 | 00 | 2s+2ps−2qs |
| 11 | 11 | 01 | 2s+2ps |
| 11 | 11 | 10 | 2s+2ps |
| 11 | 11 | 11 | 2s+2ps+2qs |

Figure 5:
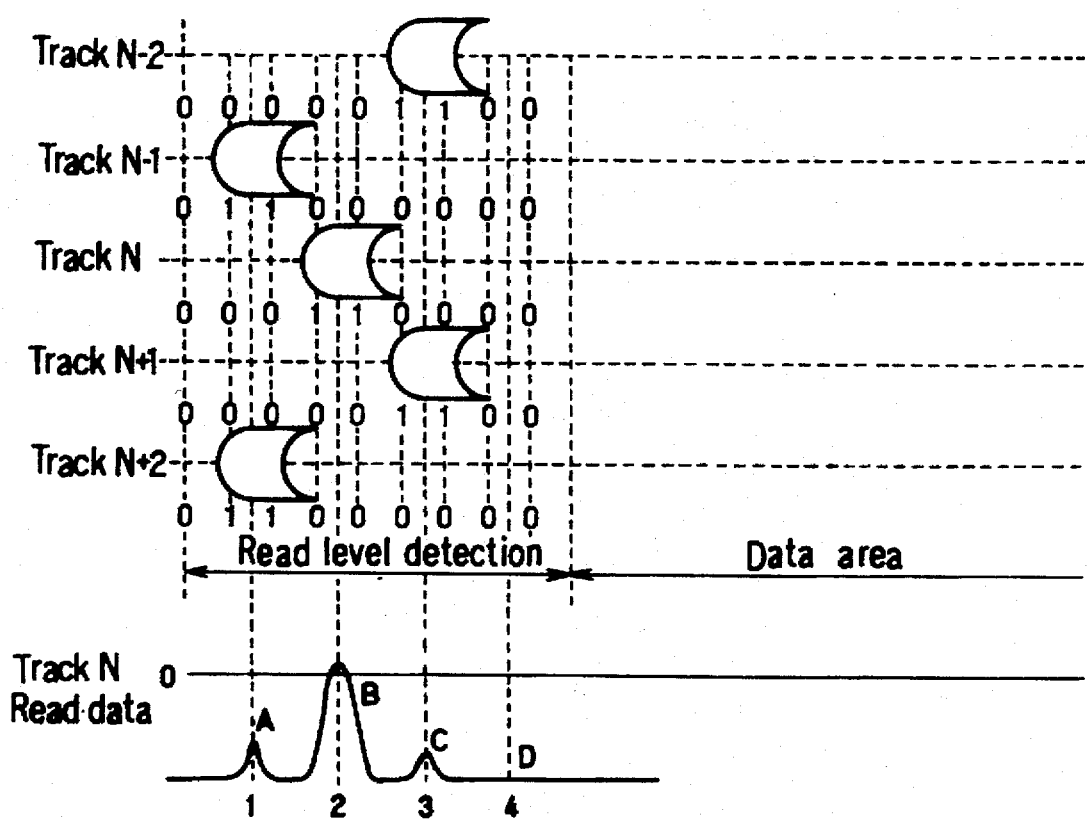
FIG. 5 is an explanatory diagram of a method for detecting read levels by the disk drive apparatus shown in FIG. 4.

If every possible combination of the read levels with crosstalks is known, metrics of these 64 states are calculated. Thus, data decoding can be performed by applying the Viterbi algorithm. In order to know every read level, it is necessary to know the values of s, p and q. In this disk drive apparatus, s, p and q are determined as following. The switch 207 selects either write data or the mark pattern for detecting the read levels, so that the record marks such as shown in FIG. 5 are written together with the write data. Each of these record marks has two-bit length and is written such that only one mark or no mark exists at one point in the read track and adjacent tracks thereof. When read levels of points 1–4 in FIG. 5 are A, B, C, D, following equations are derived.

$$2s+2sp-2sq=A$$

$$2s-2sp-2sq=B$$

$$-2s-2sp+2sq=C$$

$$-2s-2sp-2sq=D$$

The read level and the crosstalk levels sp and sq are obtained from above equations.

$$s=(B-D)/4$$

$$sp=(A-D)/4$$

$$sq=(C-D)/4$$

$$A+B+C=D$$

Table 6 can be rewritten using above equations of s, sp and sq as shown in Table 7.

TABLE 7

| Read track | 1st adjacent track | 2nd adjacent track | Read level |
|---|---|---|---|
| 00 | 00 | 00 | D |
| 00 | 00 | 01 | −(A+B)/2 + D |
| 00 | 00 | 10 | −(A+B)/2 + D |
| 00 | 00 | 11 | C/2 |
| 00 | 01 | 00 | −(B+C)/2 + D |
| 00 | 01 | 01 | −(B−D)/2 |
| 00 | 01 | 10 | −(B−D)/2 |
| 00 | 01 | 11 | −(B+C)/2 |
| 00 | 10 | 00 | −(B+C)/2 + D |
| 00 | 10 | 01 | −(B−D)/2 |
| 00 | 10 | 10 | −(B−D)/2 |
| 00 | 10 | 11 | −(B+C)/2 + D |
| 00 | 11 | 00 | A |
| 00 | 11 | 01 | (A−B)/2 |
| 00 | 11 | 10 | (A−B)/2 |
| | | | |
| | (omission) | | |
| | | | |
| 11 | 10 | 00 | (B−C)/2 |
| 11 | 10 | 01 | (B−D)/2 |
| 11 | 10 | 10 | (B−D)/2 |
| 11 | 10 | 11 | (B+C)/2 + D |
| 11 | 11 | 00 | −C |
| 11 | 11 | 01 | (A+B)/2 |
| 11 | 11 | 10 | (A+B)/2 |
| 11 | 11 | 11 | −D |

The level calculator 220 performs the above mentioned calculation, and outputs every possible read level to the Viterbi decoder 221. The Viterbi decoder 221 performs the most-liklihood decoding using the Viterbi algorithm having transition states with crosstalk states mentioned above, and using the possible read levels and the real read level.

Figure 7:
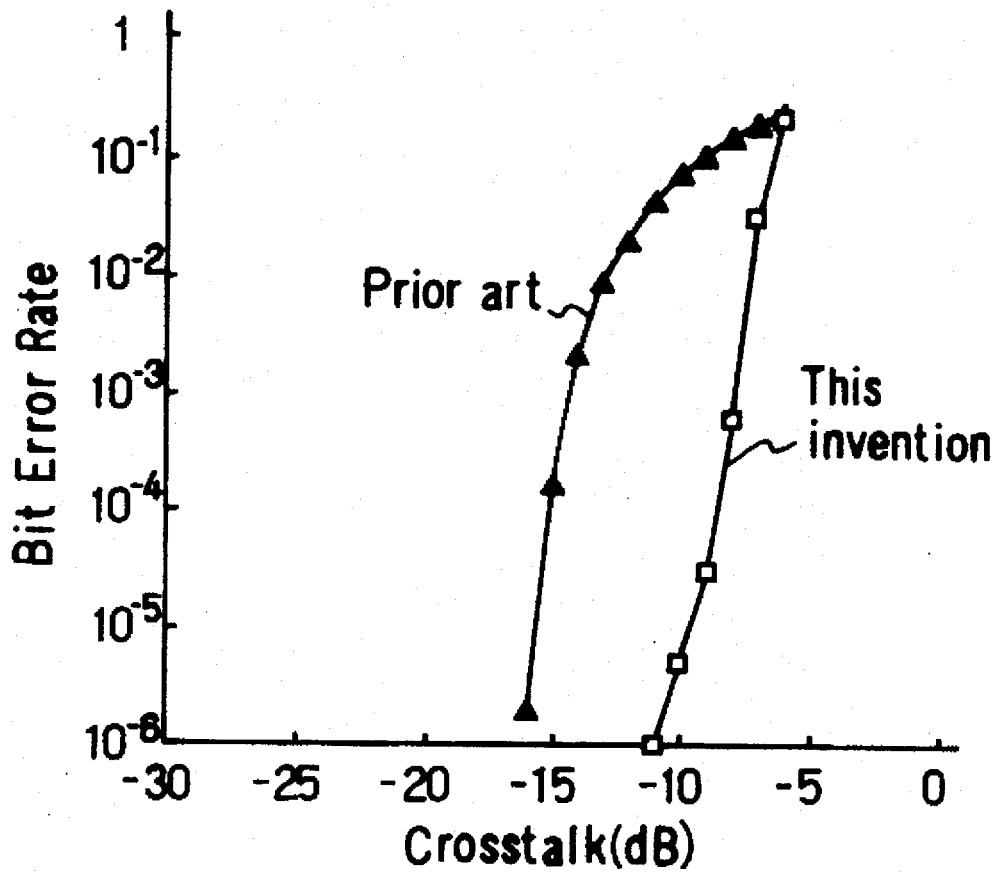
FIG. 7 is a graph of crosstalk levels vs. bit error rates comparing the disk drive apparatus shown in FIG. 4 with the disk drive apparatus in the prior art.

A graph of crosstalk levels vs. bit error rates of the disk drive apparatus explained above is shown in FIG. 7, compared with that of the disk drive apparatus that uses the Viterbi decoding method in the prior art. The abscissa of the graph is a ratio (decibels) of the crosstalk level to the read level of the read track. As shown in FIG. 7, the disk drive apparatus of this embodiment can reproduce data at low error rate even if the crosstalk is large, and suitable for write and read of a high density optical disk having a narrow track pitch.

In this embodiment, the mark for detecting the read level is written such that only one mark or no mark exists at one point in the read track and adjacent tracks thereof as shown in FIG. 5. However, it is not necessary to limit such combinations of marks. The crosstalk levels can be determined if any three states of the read levels in the read track and adjacent tracks thereof are detected, since three equations are enough to determine three variables for crosstalk levels.

Figure 8:
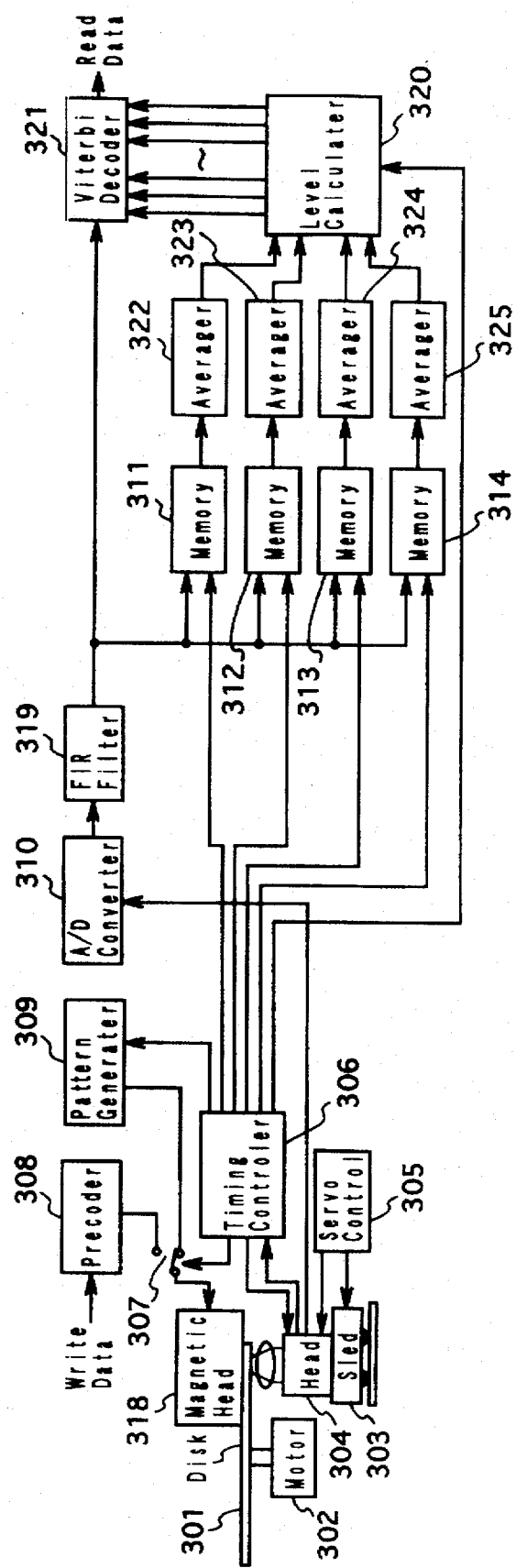
FIG. 8 is a block diagram of a third embodiment of a disk drive apparatus according to the present invention.
Figure 9:
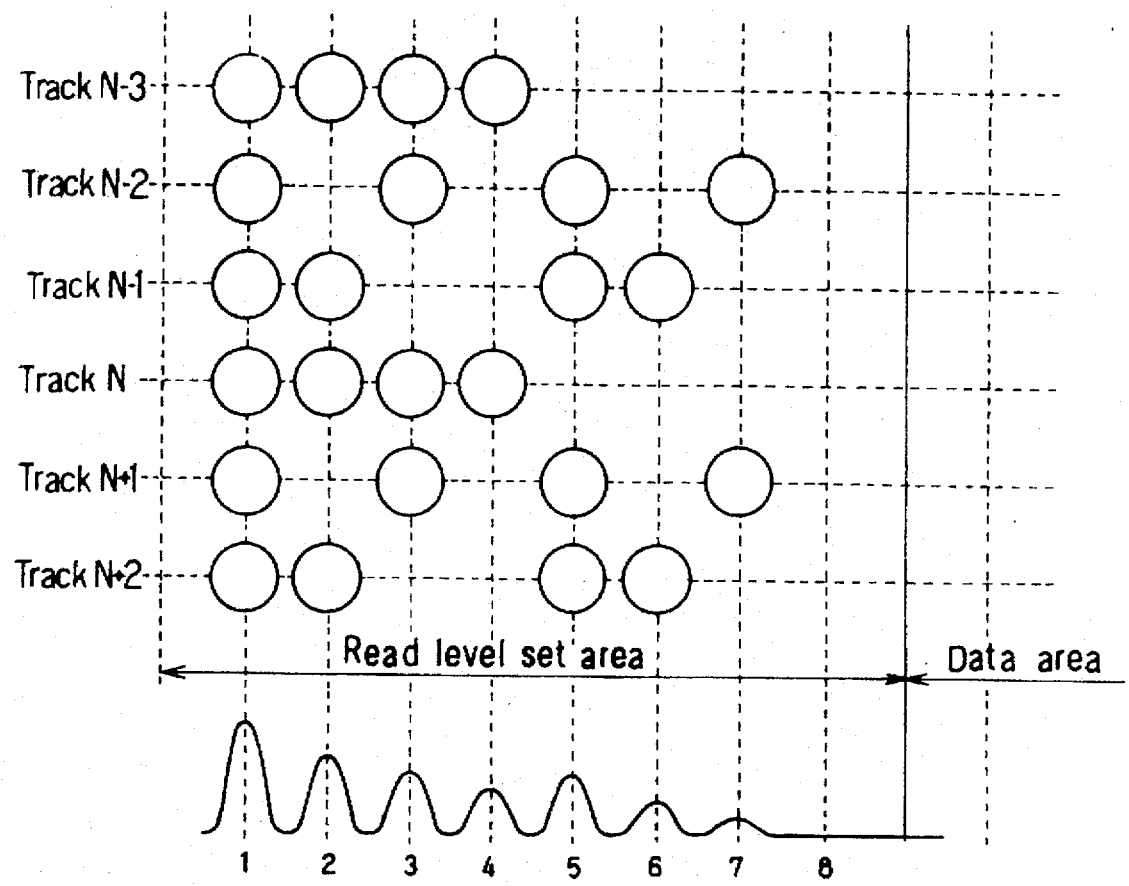
FIG. 9 is an explanatory diagram of a method for detecting read levels by the disk drive apparatus according to the present invention.

FIG. 8 is a block diagram of the disk drive apparatus as a third embodiment according to the present invention. In FIG. 8, numeral 301 is a disk storage medium for recording data, numeral 302 is a motor for rotating the disk storage medium 301, numeral 303 is a sled for moving a read/write head to the position for read/write position, numeral 304 is an optical read/write head, numeral 318 is a magnetic head for applying a modulating magnetic field to the storage medium, numeral 305 is a servo controller for controlling focus, tracking and access of the optical head 304, numeral 306 is a timing controller for controlling timing of read and write, numeral 307 is a switch for selecting a write data or a mark pattern for detecting read levels, numeral 308 is a precoder for encoding a write data, numeral 309 is a pattern generator for generating a mark pattern for detecting read levels, numeral 310 is an A/D converter for converting the read signal into a digital value, numerals 311–314 are memories for storing the read levels, numerals 322–325 are averagers for calculating the averages of stored values of the memories 311–314, numeral 320 is a level calculator for calculating read levels corresponding to states of the read track and adjacent tracks thereof from the outputs of the averagers 322–325, numeral 321 is a Viterbi decoder for performing most-liklihood decoding in accordance with the outputs of the level calculator 320.

The disk drive apparatus of this embodiment includes the averagers 322–325, which are added to the apparatus of the second embodiment. In the second embodiment, the crosstalk levels are calculated by using the read levels directly in the area for crosstalk detection. These read levels are sampled values including a noise level as well as a crosstalk level. Therefore the detecting accuracy is not high enough in the second embodiment as the read signal level and the crosstalk level are determined from the sampled value including a noise level.

However, the disk drive apparatus of the third embodiment uses average values of plural read levels, which the averagers 322–325 calculate from plural read levels detected in the plural areas for crosstalk detection. Each area is provided in each sector of the optical disk. Thus, the disk drive apparatus of the third embodiment can improve the bit error rate at one digit order compared with the apparatus of the second embodiment.

We claim:

1. A disk drive apparatus, comprising:
   means for writing three or more different states of record marks in a read track and adjacent tracks thereof on a disk storage medium;
   means for detecting read levels of said record marks in said read track, said read levels including crosstalks of said adjacent tracks;
   means for calculating every possible read level regarding every possible combination of said record marks in said read track and adjacent tracks thereof according to said detected read levels; and
   means for performing most-liklihood decoding of read signal of written data in said disk storage medium in accordance with said possible read levels as reference levels.

2. The apparatus according to claim 1, wherein said apparatus writes three or more different states of record marks in a read track and adjacent tracks thereof when data is written.

3. The apparatus according to claim 1, wherein said apparatus writes three or more different states of record marks in a read track and adjacent tracks thereof once or more times in every smallest writing unit of said disk storage medium.

4. The apparatus according to claim 1, wherein said most-liklihood decoding means perform the most-liklihood decoding by Viterbi algorithm using said possible read levels concerning every possible state transition from a state of said read track and adjacent tracks thereof.

5. The apparatus according to claim 1, wherein said writing means writes four states of record marks consisting of a state where a mark exists only in the read track, a state where a mark exists only in a first adjacent track, a state where a mark exists only in a second adjacent track, and a state where no mark exists in any track.

6. A disk drive apparatus, comprising:
   means for writing three or more different states of record marks in a read track and adjacent tracks thereof in plural areas on a disk storage medium;
   means for detecting read levels of said record marks in said read track from said plural areas, said read levels including crosstalks of said adjacent tracks;
   means for averaging plural read levels detected from said plural areas to produce average read levels;
   means for calculating every possible read level regarding every possible combination of said record marks in said read track and adjacent tracks thereof according to said average read levels; and
   means for performing most-liklihood decoding of written data in said disk storage medium in accordance with said possible read levels as reference levels.

7. A disk storage medium comprising areas for writing at least three or more different states of record marks in a read track and adjacent tracks thereof on said disk storage medium.

8. The disk storage medium according to claim 7, wherein said areas and other areas for data writing have substantially same write and read properties.

9. The disk storage medium according to claim 7, wherein at least one of said areas is provided in every smallest writing unit.

* * * * *